May 12, 1970     K. W. STOOKEY     3,511,194

METHOD AND APPARATUS FOR HIGH TEMPERATURE WASTE DISPOSAL

Filed March 25, 1968     3 Sheets-Sheet 1

Inventor
KENNETH W. STOOKEY
by JEFFERS & YOUNG
Attorneys 3,511,194
METHOD AND APPARATUS FOR HIGH
TEMPERATURE WASTE DISPOSAL
Kenneth W. Stookey, Markle, Ind., assignor, by mesne
 assignments, to Torrax Systems, Inc., North Tonawanda, N.Y., a corporation of Delaware
Filed Mar. 25, 1968, Ser. No. 719,300
Int. Cl. F23g 5/00; C10b 49/02
U.S. Cl. 110—8                                                17 Claims

ABSTRACT OF THE DISCLOSURE

Method and apparatus for high temperature disposal of waste materials in which the waste materials are charged to the upper end of a vertical gasification chamber through which the materials move downwardly under gravity as the combustible materials beneath are converted to gases, vaporous distillates, etc. The preheated hot air blast together with the combustibles develops a temperature sufficient to produce a flame temperature which will melt glass, metals and the like where a temperature is developed to fully reduce the metals, glass, etc., to a molten condition. The gaseous and vaporous products withdrawn from the upper end of the chamber are mixed with additional air and completely burned in a a secondary combustion chamber, and then passed through a waste heat boiler for extraction of thermal energy and finally through a particulate separation system before venting to atmosphere.

BACKGROUND OF INVENTION

This invention relates to a method and apparatus for disposing of waste material and is particularly concerned with such apparatus and method wherein there is a complete conversion of a variable mixture of organic and inorganic city type waste product to a fully oxidized condition by means of a partial oxidation producer gas reaction and a subsequent oxidation chamber which completes the oxidation process. The initial reaction occurs at a sufficiently high temperature so that the inorganic content of the charge materials will be converted to a neutral, molten mass, greatly reduced in shape and volume and easy to dispose of after it has been tapped from the vessel and attained ambient temperature. The system operates with maximum efficiency in producing complete oxidation of the waste material and, moreover, provides an added benefit in that the two-step oxidation process can be utilized, if desired, to provide a useful energy output.

The disposing of waste materials is a severe problem at the present time due to the great variety and quantity of materials that must be disposed of, necessitating a highly flexible system which must be adapted in its operation to meet the almost limitless compositional variety and quantity of waste disposal, while at the same time meeting all of the existing and expected governmental policies and requirements with respect to air and water pollution control.

The present invention can be adapted for disposal of an endless variety of waste, requiring a minimum of segregation and preparation requirements of the waste, no matter what the percentage mix of the organic and inorganic materials may be. It is conceivable that under certain conditions the inorganic materials such as ferrous metals, aluminum foil, glass containers, etc., could make up a high percentage of the charge and beyond the ability of the fuel portion to slag or melt. In such a case, supplementary fuel, such as coal or coke, may be introduced at the top with the charge or gas, coal or oil introduced through tuyeres at the bottom of the chamber to aid in developing the required atmosphere and temperature for melting and slagging of the inorganic materials.

The purpose of this invention is to accomplish the complete conversion of such waste to cleaned, inert gases as a by-product of the combustible and organic fraction of the charge, with the inorganic portion being concentrated as granulated solids, greatly reduced from their original volume and easy to dispose of. This result has been achieved by the use of temperature heretofore unattained, and I can control this temperature by the regulated impact of steam to both increase the water gas reactions and control the temperature.

Modern technology has generated a vast but anticipated quantity and variety of waste products, and it is intended that the present invention will provide a ready means for disposing of this waste product in a rapid and efficient manner notwithstanding changes in composition of waste products which are bound to occur from time to time during the operation of the apparatus. Due to the large volume of waste materials that must be handled (particularly in regions of high population density), substantially the only feasible manner of processing and disposing of waste materials is by combustion, land fill and open dumping. By far the most efficient and desirable of these methods is high temperature disposal if such can be carried out in such a manner that the products are completely combusted. The reason why high temperature disposal has not been more extensively adopted is that waste products often include noncombustible ingredients which defy combustion and have prevented this method from being efficient. The presence of the by-products of combustion are noxious particles, smokes, vapors and the like which contribute to air pollution and have led many municipalities to ban the use thereof.

OBJECTS

With the foregoing in mind, it is a primary object of the present invention to provide both a method and apparatus for the disposing of waste materials in which the previously noted drawbacks attendant to the known practices of combustion disposal are substantially entirely eliminated.

It is another object of the present invention to effect by means of a high temperature disposal process an automatic separation of the noncombustible metal and glass products as molten materials which are separately withdrawn from the system for disposal so that the presence of such materials in no way prevents the conversion of the organic product to a fully oxidized condition. Continuously, the inorganic products are melted, fused, and tapped off at the base of the incinerator for disposal separately from the organic product, and being greatly reduced in volume are more readily disposed of.

Another object of the present invention is the provision of a method and apparatus for the disposal of waste material in which a substantial portion of the heat content of the waste material in the process of combustion is usefully recoverable during the process.

A still further object of the present invention is the provision of a method and apparatus for disposing of waste materials by high temperature combustion which is characterized by a complete elimination of noxious or toxic by-product vapors, fly ash and other materials at the point of discharge to the atmosphere.

It is an over-all object of the present invention to provide a method and apparatus which can operate continuously with minimum supervision and which is noncritical with respect to the content of the waste product which is fed thereto on either a continuous of semi-continuous basis.

My process can also be used with steam as a means for controlling the high temperatures attained in the system and as part of such usage the steam reacts with the carbonaceous materials to produce a water gas fraction usable in the secondary combustion chamber for producing useful thermal energy. Consequently, I effect both controlled cooling and generate useful gases as well.

The presence of metals, glass and difficult to incinerate products previously caused clumping of the charge and a consequent clogging of the waste disposal apparatus. Moreover, there still exists the problem of disposing of these materials. The present invention fully reduces these noncombustible metals and nonmetals to be melted and reduced in volume to be separated and more easily disposed of.

The described process is especially advantageous for municipal disposal systems in which the householder no longer has to make separations of metals from garbage or other waste products but can indiscriminately dump any product whatsoever, and the system can accommodate any and all such combinations of combustible and noncombustible products.

DETAILED DESCRIPTION OF APPARATUS AND PROCESS

Figure 1:
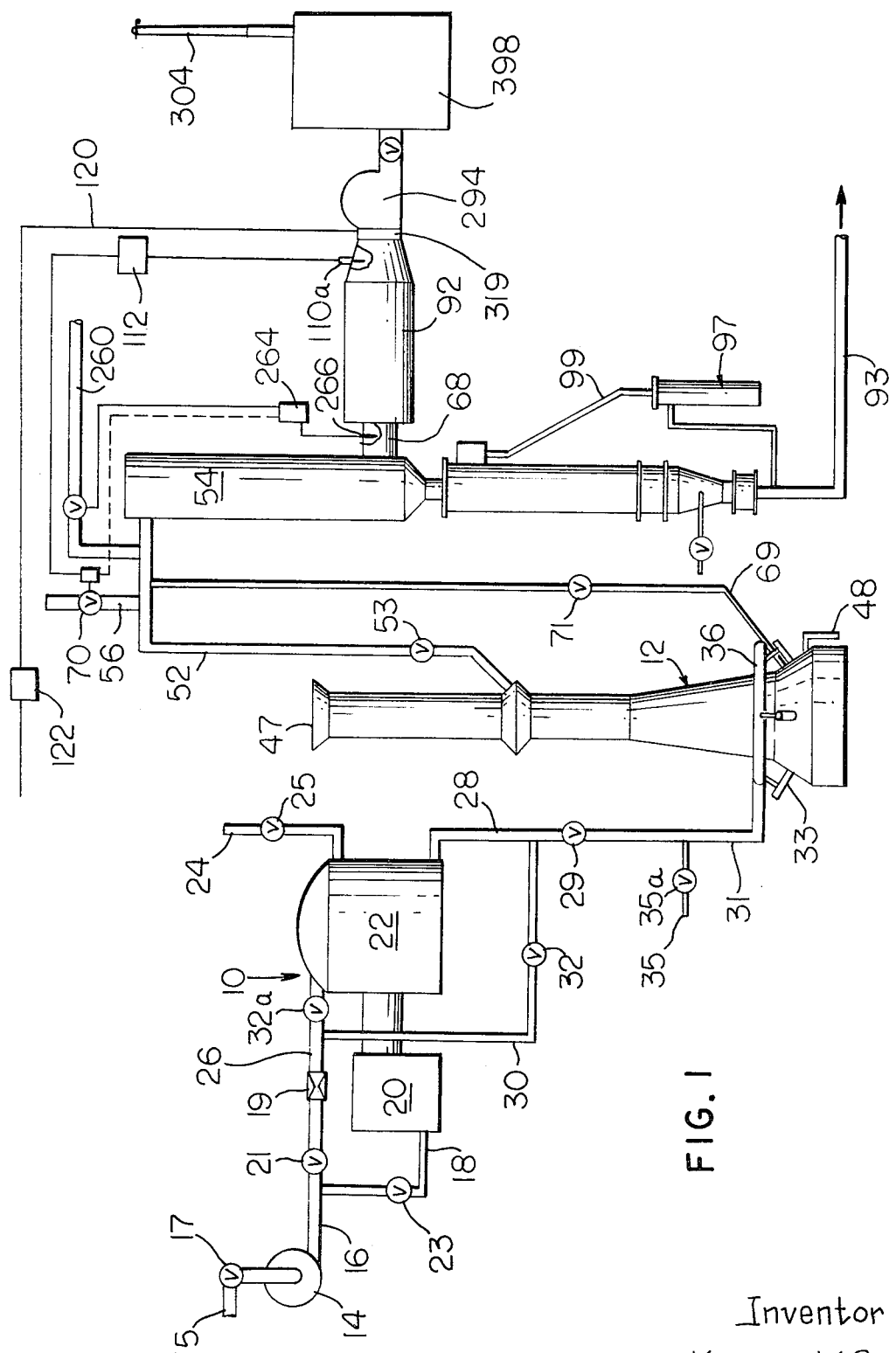
FIG. 1 is a somewhat diagrammatic representation of a waste disposal system according to the present invention.

Referring to the drawings more in detail, and with particular reference to FIG. 1, the portion of the device illustrated therein and generally indicated at 10 is for the purpose of supplying hot air blast to the hearth 40 of a vertical shaft gasifier which is generally indicated by reference numeral 12. The device at 10 includes a forced draft fan 14 with an inlet line 15 and blower inlet control valve 17 which supplies air to line 16 which then splits into a first branch 18 and a second branch 26. The first branch 18 contains a combustion control valve 23, and the purpose of the first branch is to provide combustion air to a combustion device 20. The branch line 26 provides process air which passes through a valve 21 and measuring restriction 19, then to heat exchanger 22. Exhaust line 24 from the heat exchanger 22 vents the combustion products to atmosphere after passing through a throttling valve 25 which creates sufficient back pressure to retard leakage within the heat exchanger 22.

Details of the heat exchanger 22 are available by reference to my previously filed and now issued Pat. No. 3,220,713, entitled "Refractory Heat Exchanger," issued Nov. 30, 1965. The line 26 which supplies the process air leads to the heat exchanger 22, and leading from the heat exchanger 22 is a flow of heated process air passing through line 28 and thence to the gasifier indicated at 12. The line 28 which includes a control valve 29 and steam line 35 controlled by valve 35A becomes a hot air blast line 31 leading to a bustle pipe 36 positioned at the bottom of the vertical gasifier 12. The hot air blast line 31 may be controlled in temperature by a cold air bypass line 30 having a valve 32. Valves 32 and 32A determine the relative amounts of bypass air through the line to control its temperature at the time of introduction to gasifier 12.

The bustle pipe includes a number of penstocks each having tuyeres 33 which are circumferentially spaced around the base of the vertical shaft gasifier and which project into the base of the vertical shaft gasifier. At the base of the vertical shaft gasifier is a hearth 40, this also being a zone which is sometimes referred to in the art as a well. The well 40 has one or more sealed tap holes 48 which serve as an outlet for the fluid inorganic waste product 41 which is drained from the gasifier 12 and is thereby separated from the organic waste product.

The waste material is initially charged to the gasifier at the upper end 46 through access opening 47. The waste product can be continuously or semi-continuously charged to the upper end 46 depending upon design preference. For example, this charging can be accomplished by batch charges or continuous belt conveyor means can be provided for continuously conveying the waste material into the upper end 46 of the gasifier. The hot air blast supplied to the gasifier through the tuyeres 33 can vary in temperature, but a temperature which can be typically used in the present process with excellent results is in the order of 1800° to 2200° F. With this order of hot air blast temperature, the temperature generated within the gasifier is in the order of 4000° F. or above, this being sufficient to melt out all of the inorganic content of the waste material. I can regulate the temperature and rate of hot air blast with valves 32, 32A and steam from steam line 35 by operation of valve 35A.

It should be further understood that the hot air blast temperature and amount of air can vary and will be reduced in temperature for low orders of inorganic content and are correspondingly increased in temperature for higher concentrations of inorganic content of the waste material.

Figure 2:
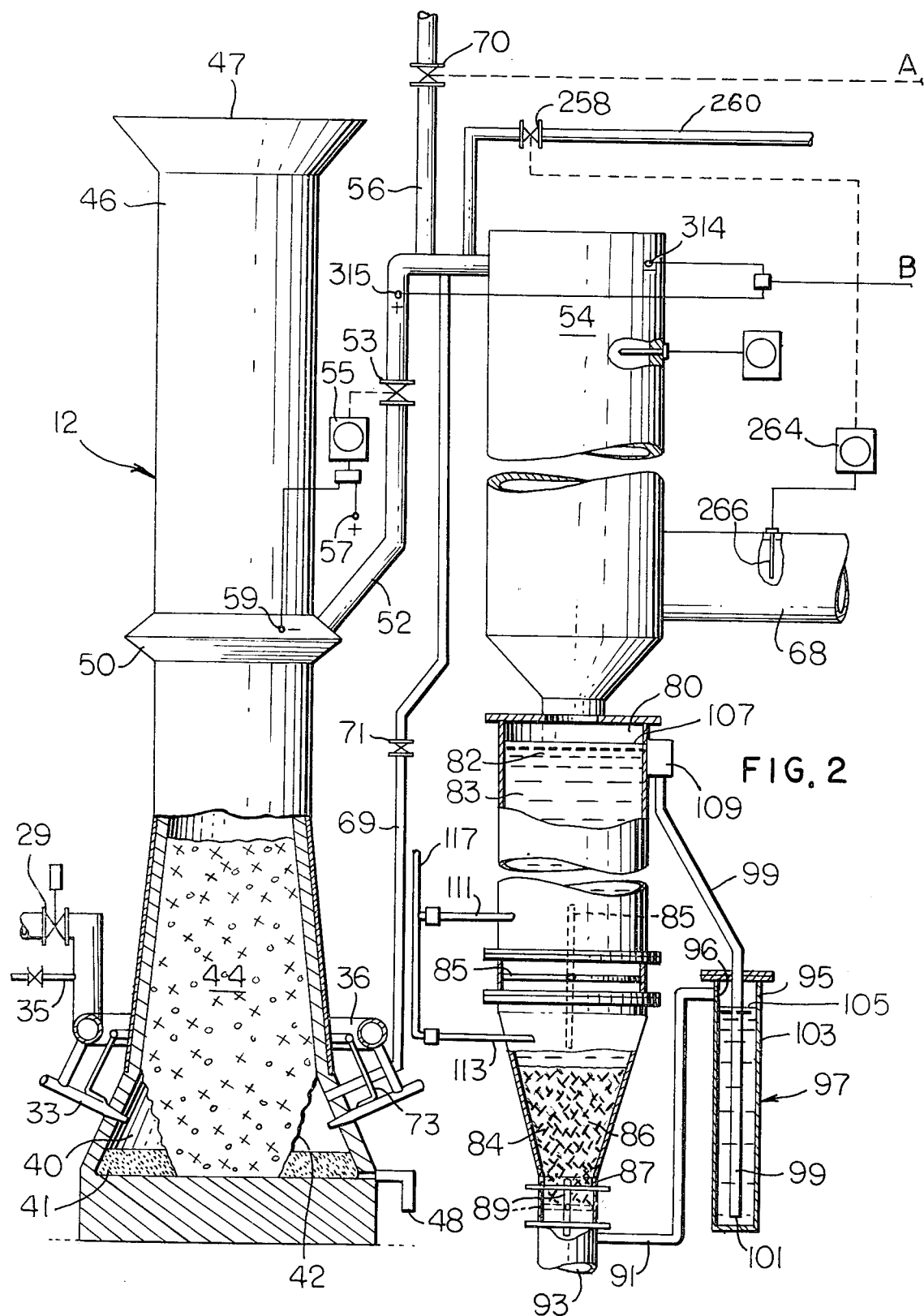
FIG. 2 is a detailed enlarged view of the system partly in section and showing a gasifier to which the refuse is charged and which is followed by a secondary combustion chamber together with accompanying control devices.

At the upper end of the gasifier is a gas collection ring 50 from which a line 52 passes to the upper end of a secondary combustion chamber 54. The line 52 contains a valve 53, and the valve 53 contains a pressure control device 55 (FIG. 2) with suitable barometric control sensor in the gas collection ring 50 to maintain a subatmospheric pressure sufficient to keep the uprising gases from the base of the gasifier from exiting at the upper end 46 of the gasifier and causing any portion of the outflow to leave through the line 52. Device 55 has sensing outlets at 57 to atmosphere and at 59 within the gas collection ring 50 and at 53 within line 52. These signals are fed centrally to the device 55 which has a servo outlet leading to the valve 53 for maintaining the suitable valve setting whereby pressure conditions are maintained such that subatmospheric pressure always exists at the upper end 46 to keep all of the gases flowing through line 52. Should there be a substantial increase in the inorganic content of the waste product and the temperature in the hearth 40 tends to reduce, then a combustion product bypass line 69 having a control valve 71 is operated so that the normally closed valve 71 is opened by a sufficient amount to allow the hot blast line to communicate through the hearth to the combustion product bypass line 69, thus increasing the temperature in the hearth 40 and at the same time reducing the rate of down flow of the waste material within the gasifier. If the hearth temperature is still insufficient, it is possible to increase the hearth temperature further by providing auxiliary fuel from line 73 which injects fuel in proximity with the tuyeres 33 and, since the combustion product bypass line 69 is opened by valve 71, this will have the effect of increasing the temperature of the hearth to fully reduce the inorganic product to a melt and without increasing the rate of down flow of the waste within the gasifier to produce a plugging at the base of the gasifier. This way the unit is never plugged, but the appropriate temperature is always maintained in the hearth 40.

The unit is thus readily adaptable by suitable control means to high metals content waste as well as low metals content waste. The material passing upwardly through line 52 will contain considerable entrained particulate material, but this is separated from the system in a manner which will be later described. The composition of the gaseous flow in line 52 is producer gas, and it will be caused to burn to a completely oxidated condition within the secondary combustion chamber 54. At the bottom of the secondary combustion chamber 54 is a separator 80 comprising a chamber 82 with water 83 contained therein having the function of creating a water seal separating the interior of the combustion chamber 54 from atmosphere. The device 80 serves as a seal which separates the combustion chamber 54 from atmosphere and also serves to collect some of the solid phase particulate material which is entrained with the combustion product flow from line 52 or line 52 and line 69.

In brief description, the device 80 contains a quantity of water 83 with a submerged valve 85 which is movable between the dotted line position which is its normal position and the full line position which it assumes during discharge of the collected particulate material at the base 86 at the time that the material 84 is discharged through exit or outlet opening 87, also containing a control valve 89 which is movable between normal dotted line position and the full line position at the time of discharge. A line 91 leading from the outlet or dropout 93 leads to the upper end 95 of a water seal 97 with a submerged line 99 having an open end 101 facing downwardly within container 103 which is filled with water to approximately the level 105. The line 99 in turn leads to the upper level 107 which includes an overflow 109 maintaining the level 107. Two water inlet lines 111 and 113, respectively, are used to provide makeup water from a supply line 117 at locations vertically above and below the valve 85.

In operation, when it is desired to discharge the solid content 84, the valve 85 is moved from its dotted to full line position, and valve 89 is moved from dotted to full line position, and the solid material 84 is discharged through the outlet 93. The subatmosphere pressure within the combustion chamber 54 is maintained, however, since the water level remains substantially at the level 107, thus safeguarding the subatmospheric pressure within combustion chamber 54 even though the solid material 84 is discharged to atmosphere.

After the conically-shaped bottom portion of the container is fully discharged of its solid material content, the valve 89 is returned from its full line position to the dotted line position, water is supplied from line 113 to fill the volume which has been displaced by the exiting of the solid contaminant 84, and after it is completely filled with water, the valve 85 is then moved from its solid line position to the dotted line position.

The water which is displaced by refilling of the lower end of the container with solid contaminant is provided by means of the overflow 109 which causes the displaced water to be maintained at the overflow level 107, and such excess water is passed through the line 99 downwardly through 101 and as the level 105 increases the overflow line 91 will permit removal of the overflow water. The operation as described functions to maintain the subatmospheric pressure within the combustion chamber 54 at all times while periodically permitting the discharge of the solid contaminant 84.

The producer gas within the combustion chamber 54 is provided with secondary air and is caused to burn completely. The secondary air is provided from line 56 which is controlled by a valve 70. The amount of secondary air is determined from an oxygen analyzer probe 110A associated with an oxygen analyzer 112 which is located to monitor continuously the outflow of combustion product from the waste heat boiler 92. The oxygen analyzer 112 is set to monitor the outflow so that there is a constant low level of oxygen content indicating complete combustion within the secondary combustion chamber 54.

In the event that incomplete combustion has occurred, the lack of oxygen will be sensed through 110A and analyzer 112 to valve 70, causing the valve 70 to open and increase the amount of secondary air from line 56, thereby effecting complete combustion of the producer gas within secondary combustion chamber. On the other hand, if there should occur an excess of oxygen indicating an over amount of secondary air, the valve 70 will be throttled decreasing the inflow of secondary air, providing precisely the amount of air to effect optimum combustion conditions in chamber 54.

In the event that steam is being generated from waste heat boiler 92, and sufficient calorific gas is produced by the gasifier, the drop in temperature will be sensed by means of a heat sensing probe 266 which leads to a control 264 having a servo connection with the gas valve 258 in line 260 leading to a secondary fuel source. For example, should the temperature fall, this will be sensed by a decrease in temperature which will open the valve 258 and increase the amount of makeup fuel leading to line 52 which serves as an inlet to the secondary combustion chamber 54. Therefore, sufficient heat will be continuously generated to maintain a constant production of heat within the waste heat boiler 92. Conversely, should the producer by generating sufficiently high calorific producer gas, the temperature will be maintained by its operation such that the servo 264 will maintain the valve 258 either at closed or throttled position demanding less in the way of makeup heat from the auxiliary source 260.

Thus, by means of a combination of the B.t.u. supply either from the gasifier 12 or from the makeup auxiliary line 260, or both, there will be a constant generation of heat to provide through the waste heat boiler 92 a constant quantity of useful heat energy for whatever purpose intended.

Figure 3:
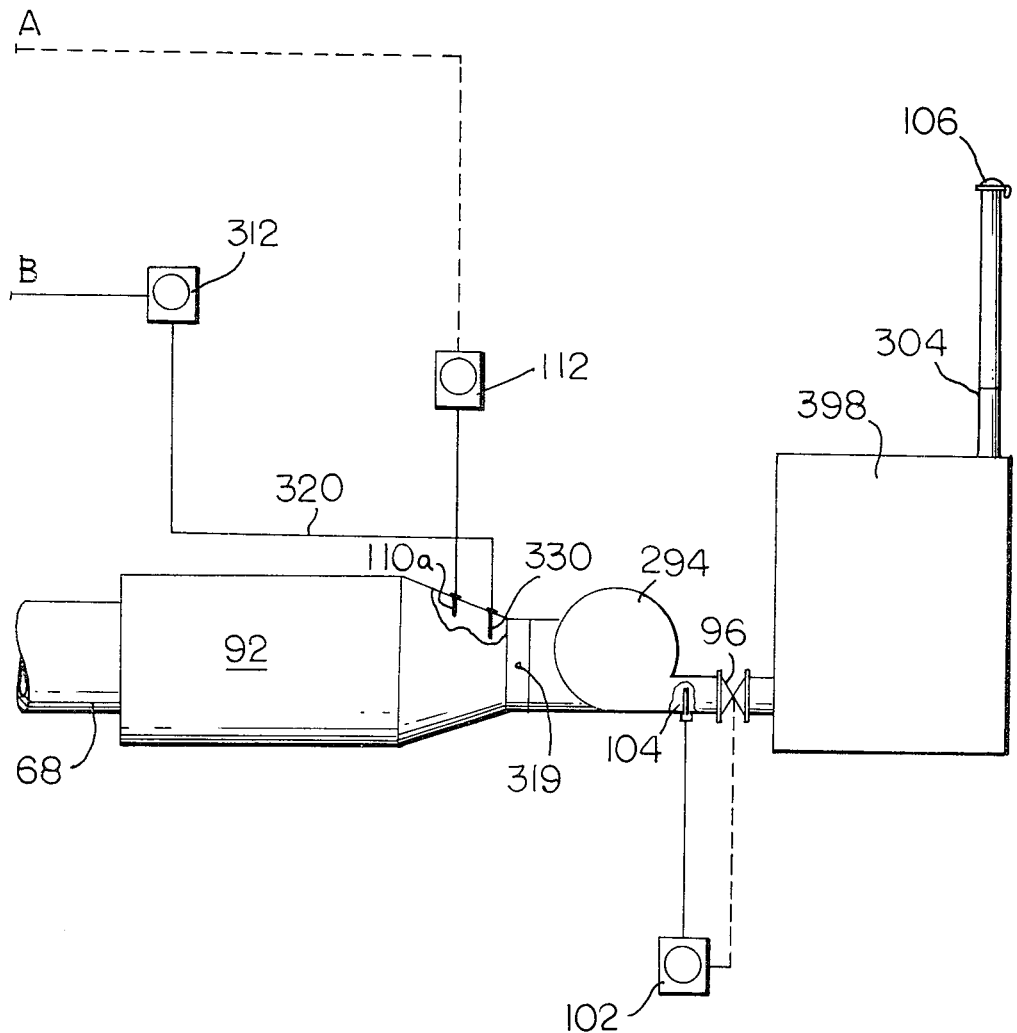
FIG. 3 is a detailed enlarged view of the portion of the system following that indicated in FIG. 2 and illustrating a waste heat boiler, exhaust fan, and a following gas cleaner, again with the necessary control devices in connection therewith.

From the waste heat boiler 92, the exit gases are drawn at a constant pressure from a constant speed exhaust fan 294. A valve 319 is disposed between the waste heat boiler 92 and the fan 294 and is operated from a line 320 by a control 312 (FIG. 3) having differential pressure probes 314 and 315 at the upper end of the secondary combustion chamber 54 and in line 52 respectively and probe 330 in boiler 92 so that suitable differential pressures are maintained at these locations for proper performance of the system at all times. Thus, should the differential pressure be reduced for any reason, the valve 319 will be operated to reinstate the proper differential pressure and, conversely, should the differential pressure increase above its optimum value, the valve will close to throttle waste gas flow sufficiently to return the differential pressure to its proper value. The described monitoring occurs continuously and maintains a suitable differential pressure at all conditions of operation of the apparatus.

The exhaust gases from the waste heat boiler are led to a gas cleaner 398 which may be used for removing any finely entrained material. A second stage can also be used for removing chlorine or other halogen gas by means of chemical neutralization. The ultimate products of combustion are then vented to atmosphere through a stack 304.

At the point of ventilation the outlet gases have been combusted to an ultimate condition and are free of particulate material by reason of the operation of the separator 398. These gases at this point are in their ultimate form of oxidation and purity. The gases are at this point sufficiently pure to conform with Government regulations of air pollution.

OPERATION

In operation, there is continuously supplied a hot air blast to the hearth 40 of the vertical shaft gasifier 12, the temperature and amount of the hot air blast being controlled by means of regulating the valves 32, 32A as well as by controlling the operation of the combustion device 20. The quantity of hot air blast and temperature is of course in accordance with the composition of the waste material which is intended to be converted within the vertical shaft gasifier 12. Assuming that there is a high noncombustible content, the temperature will be relatively high and lower quantities of hot air blasts will be used; and conversely, where there is a high combustible content of waste, the temperature of the hot air blast can be correspondingly lower and such air will be in greater amount in order to provide an oxygen balance necessary for effecting complete combustion. One of the important hallmarks of the present invention is the fact that the hot air blast used is in the order of approximately 1,800 to 2,200 degrees F. which is sufficient to effect a complete reduction of all the materials within the gasifier either to a molten condition which is the case with glass, metals, etc. or to a gaseous condition which is the case with the combustible components of the waste material.

The hot air blast is introduced into the hearth 40 and either travels in its entirety vertically upwardly through the charge of waste product 44 which is introduced through the inlet 47 or a portion of it is bypassed through line 69 in order to confine the heating more to the hearth zone which is the case required for high noncombustible content waste material. Assuming that there is relatively small amount of metal, the line 69 will be substantially completely closed or entirely closed as the case requires. The hot air blast with a suitable combination of fuel injectant from line 73 will produce a relatively high enough temperature to make producer gas within the gasifier 12. At the upper end of the gasifier 12 there is taken out through line 52, the flow of gaseous and vaporous products, which will consist largely of carbon monoxide, carbon dioxide, water vapor, nitrogen, combustible distillates of widely varying composition, etc. These latter will be driven off from the charge materials 44 by heat exchange with the highly heated gases generated in the hearth zone 40 passing upwardly through them, there being no free oxygen left after passing through the hearth zone 40. Also, it is expected that a certain amount of entrained particulate material will also be found in the flow through line 52.

There is maintained pressure conditions within the gasifier 12 so that there is a slight subatmospheric pressure within line 52 so that the combustion product flow does not exit through opening 47 where the material is charged to the gasifier 12.

The outflow of gaseous and entrained material from line 52 is led to secondary combustion chamber 54. At this point it is mixed with sufficient air, and in some cases secondary fuel, to effect a complete combustion of the producer gas and the thermal energy is then converted to a useful form of energy by passing the gases from the secondary combustion chamber 54 through line 68 to a waste heat boiler 92.

Pressure conditions are continuously monitored within the secondary combustion chamber 54 so that there is continuously maintained therein a pressure which is somewhat less than the pressure in line 52, thus causing a continuous flow of gaseous material from the line 52 into the secondary combustion chamber 54. Also, there is continuously monitored the oxygen content of the outflow from the secondary combustion chamber 54 so that enough makeup air is continuously supplied to achieve substantially complete combustion of the producer gases at the time that they exit from the secondary combustion chamber 54. The foregoing results are achieved by means of suitable temperature probes 266 which, through a control 264, determine the amount of makeup fuel from line 260 which is necessary to achieve a relatively constant B.t.u. output for the waste heat boiler 92, and the oxygen content is continuously tested from the waste heat boiler 92 through probe 110A and control 112 controls the valve 70 which determines the amount of secondary air incoming through line 56 to mix with producer gas flow from line 52.

Within the secondary combustion chamber 54 a solid particulate material is continuously removed without varying the vacuum conditions within the chamber 54 by means of a separator which operates with a butterfly valve 85 in normally dotted line position and with a second butterfly valve 89 in its normal dotted line position. A quantity of water which is at level 107 remains at that level at all times by means of an overflow from 109 to container 103 and then outlet 96 which removes the excess water. At the time it becomes necessary to discharge the settled-out material, butterfly valve 85 is moved from its dotted position to full line position 85 thus maintaining the overlying quantity of water sufficient to maintain the vacuum within chamber 54. The butterfly valve 89 is moved from a dotted line position to full line position thus dropping out the material 84. After discharge, the butterfly valve is moved from full line position to dotted line position, and the void created by discharge of the solid settled-out particulate material and water is occupied by incoming water from line 113. After that portion of the system below valve 85 is filled with water, the butterfly valve 89 which is then returned to its dotted line position is in position to receive additional settled-out material and the butterfly valve 85 moves from full line position to dotted line position. All of this takes place while maintaining liquid at the level 107 which is sufficient to maintain the vacuum at all times. This periodic discharge of particulate material can take place without disturbing the continuous process as has been previously described.

The process as described has numerous inherent advantages some of which can be summarized by saying that the apparatus and process is adapted for meeting the requirements of any of an endless variety of waste materials which are received from municipalities, industries and the like, and is capable of efficiently processing substantially any description of waste products be they derived from sewage processes, industrial processes, or municipalities. In end result, the combustibles are reduced to a fully combusted condition and the metals are reduced in volume and, being reduced to a molten condition, can be more readily disposed of in a reduced volumetric form.

The system is entirely hygienic. It is automatic in its operation and can be used with a relatively small amount of training by personnel having only ordinary skills, once they are acquainted with the parameters of operation.

As a further example of the invention, whenever the waste material becomes of greater metallic content, the heating must be more confined to the hearth zone by opening bypass line 69 and reducing the rate of downflow of the charge. A greater quantity of fuel is also added through the tuyeres or may be added through the top to achieve the higher temperatures necessary for the greater magnitude of non-combustible material in the waste product processed. In every instance, the temperature, the rate of flow, the hot air blast, and the supplementary fuel are precisely and carefully regulated in accordance with the character of the waste material to achieve optimum generation of producer gas, which is burned in such a way as to realize useful thermal energy. Also, operating conditions are regulated in accordance with the particular melting temperatures of the metals in the waste material.

The end product is a colorless, odorless and acceptable effluent of carbon dioxide, water vapor and nitrogen which may be safely vented to the atmosphere without risk of pollution of the air. Also, such noxious gases as halogen gases or other byproduct gases may be removed by scrubbers or the like so that the effluent gases are harmless and meet known Federal and State regulations with respect to air pollution.

Although the present invention has been illustrated and described in connection with a single example embodiment, it will be understood that this is illustrative of the invention and is by no means restrictive thereof. It is reasonably to be expected that those skilled in the art can make numerous revisions and adaptations of the invention to suit individual design requirements and it is intended that such revisions and adaptations which in-

I claim:

1. An apparatus for the disposal of waste material including organic and metallic content therein, comprising: a substantially vertical chamber having means for charging said waste material into the upper portion for movement downwardly through said vertical chamber, means for supplying a hot air blast to a lower portion of said chamber for movement upwardly through the ignited waste material charge therein and generation of a producer gas including volatiles distilled from said material present therein and converting the inorganic materials to a molten condition at the lower portion of said first chamber, means for removing the molten inorganic material at the bottom portion of said first chamber, a secondary combustion chamber operatively connected to said vertical chamber, means for conducting said producer gases and volatiles from said vertical chamber to said secondary combustion chamber for complete combustion therein, and control means for maintaining a predetermined pressure and air supply in said secondary combustion chamber to effect substantially complete combustion of the producer gases therein.

2. An apparatus according to claim 1 in which said means for supplying hot air blast to said first chamber comprises a heat exchanger having an inlet for air to be heated, and an outlet for said heated air operatively connected to the bottom portion of said vertical chamber, said hot air blast being at a temperature sufficient to effect substantially complete reduction of the inorganic material to a molten condition.

3. An apparatus according to claim 1 in which said first chamber includes an annular hearth at the lower portion thereof and a secondary outlet from said annular hearth to said secondary combustion chamber and including valve means therein operative in accordance with the composition of the waste material to effect substantially complete reduction of the inorganic material to a molten condition at the base of said first chamber.

4. An apparatus in accordance with claim 3 including means for supplying combustible fuel to said hearth to control the temperature generated within said hearth in accordance with the composition of the waste material supplied to said vertical chamber.

5. An apparatus in accordance with claim 1 including a plurality of circumferentially spaced penstocks having tuyeres attached thereto that project into said hearth to provide an inflow of hot air blast for combustion operation.

6. An apparatus according to claim 1 including means for controlling the pressure of the producer gases exiting from said first chamber to control the inflow of atmospheric air through the upper portion of said first chamber.

7. An apparatus in accordance with claim 1 including means for continuously sensing the oxygen contant of combustion gases from said secondary combustion chamber to provide a predetermined ratio of fuel/air ratio to provide substantially complete combustion of gases within said secondary combustion chamber.

8. An apparatus in accordance with claim 1, including means for continuously monitoring the temperature of combustion effected through said secondary combustion chamber to provide a substantially constant production of heat energy from said combustion, and means for providing supplementary heat and operatively controlled by said monitoring means to provide in conjunction with said combustion operation a substantially constant thermal generation of usable energy.

9. An apparatus in accordance with claim 8 including a waste heat boiler for receiving such heat and generating steam for the production of usable energy.

10. A method of disposing of waste material which includes both combustible and incombustible materials, comprising: passing the waste materials downwardly within a substantially vertical combustion chamber, directing a hot air blast into the lower portion of said combustion chamber to effect an upward movement of such hot air blast through the charge of downwardly moving waste material, and thereby generating a combination of producer gas and volatilized ingredient portion therein, removing the producer gas and volatilized material from the upper region of said first chamber and conducting such material into a secondary combustion chamber, combining such outflow of gases from the vertical chamber with an inflow of secondary air of a sufficient quantity to effect substantially complete combustion of said gases within said secondary combustion chamber, and thereafter converting the heat from such gases into a useful form of energy.

11. A method of disposing of waste material which includes both combustible and incombustible fractions, comprising: passing the waste materials downwardly within a substantially vertical combustion chamber, directing a hot air blast into the lower portion of said combustion chamber to effect an upward movement of such hot air blast through the charge of downwardly moving waste material and thereby generating a combination of producer gas and volatilized ingredient portion therein, removing the producer gas and volatilized material from the upper region of said first chamber, conducting such material into a secondary combustion chamber, and combining such outflow of gases from the vertical chamber with an inflow of secondary air of a sufficient quantity to effect substantially complete combustion of said gases within said secondary combustion chamber.

12. The method in accordance with claim 11 including the step of effecting a final filtration of the products of combustion from said secondary combustion chamber and then venting such gases to atmosphere.

13. The method in accordance with claim 11 including the step of continuously regulating the inflow of secondary air in accordance with the oxygen content in the outflow of gases from said secondary combustion chamber.

14. The method in accordance with claim 11 including the step of providing a flow of outlet gaseous materials from the lower portion of said first chamber to regulate the temperature and rate of downflow of waste material within said first chamber.

15. The process in accordance with claim 14 including means for injecting additional flow of fuel into said hearth to control the temperature therein in accordance with the composition of the waste material which is being consumed.

16. The process in accordance with claim 15 including the step of continuously regulating the differential pressures within said apparatus to regulate the rate of flows within said apparatus.

17. The process in accordance with claim 11 including the step of regulating the temperature within said combustion chamber by injecting steam therein.

References Cited

UNITED STATES PATENTS

| 1,598,390 | 8/1926 | Piernay | 110—8 |
| 2,729,301 | 1/1956 | Ekstrom | 110—8 XR |
| 3,412,696 | 11/1968 | Ehrenzeller et al. | 110—8 |

FOREIGN PATENTS

| 18,291 | 1889 | Great Britain. |

KENNETH W. SPRAGUE, Primary Examiner

U.S. Cl. X.R.

110—31